Dec. 12, 1961 M. CAMRAS 3,013,123

ELECTROMAGNETIC PLAYBACK SYSTEM

Filed March 15, 1954 2 Sheets-Sheet 1

Inventor
Marvin Camras by Hill, Sherman, Meroni, Gross & Simpson Attys

Dec. 12, 1961 M. CAMRAS 3,013,123

ELECTROMAGNETIC PLAYBACK SYSTEM

Filed March 15, 1954 2 Sheets-Sheet 2

Inventor
Marvin Camras by Hill, Sherman, Meroni, Gross & Simpson Attys

United States Patent Office 3,013,123

Patented Dec. 12, 1961

3,013,123
ELECTROMAGNETIC PLAYBACK SYSTEM

Marvin Camras, Chicago, Ill., assignor to Armour Research Foundation of Illinois Institute of Technology, Chicago, Ill.

Filed Mar. 15, 1954, Ser. No. 416,187
1 Claim. (Cl. 179—100.2)

This invention relates to an electromagnetic playback system for reproducing signals recorded on magnetic record media.

In my U.S. Patent No. 2,803,708 I have disclosed and claimed a system for recording signals by shaping the longitudinal recording field so as to have a very rapidly decaying magnetic intensity in the region of the trailing pole. This is accomplished by superimposing upon the main recording field at the trailing pole an auxiliary field of magnitude and direction so as to oppose and modify the main recording field. Important new results are obtained by positioning the erase gap of a two gap head sufficiently close to the recording gap so that leakage flux from the erase magnetic circuit is superimposed on and modifies the high frequency bias field in the region of the trailing pole. Thus while said patent discloses in certain embodiments the use of magnetic poles laterally offset from the main longitudinally spaced poles, the controlling concept specifically disclosed in said patent is to impose a signal of the same frequency on both the laterally offset poles and the longitudinally spaced poles.

The presently claimed invention resides in a playback system comprising in combination a magnetic record member having a layer of magnetizable material with a pair of contiguous but laterally offset recorded traces extending therealong, one of said traces having magnetic fields extending substantially longitudinally to constitute a longitudinally recorded trace and the magnetic fields varying in the longitudinal direction along the record member in accordance with higher frequency components of a signal recorded on the record medium, the other of said traces having magnetic fields extending substantially transversely to constitute a transversely recorded trace, the magnetic fields varying in the longitudinal direction along the record member in accordance with lower frequency components of the signal recorded on the record medium, said recorded traces having substantially stronger leakage fields at a surface of said layer of magnetizable material than at the opposite surface of the record member, magnetic playback head means cooperating with said surface of said layer of magnetizable material and having a pair of pole portions defining a longitudinal gap for coupling the head means to said longitudinally recorded trace and having a pair of transversely spaced pole portions defining a transverse gap for coupling the head means to said transversely recorded trace, said magnetic playback head means having a longitudinally magnetic circuit including said pair of pole portions defining said longitudinal gap and having a transverse magnetic circuit including said transversely spaced pole portions and said transverse gap, said playback head means having a first output element linking said longitudinal magnetic circuit but spaced from said transverse circuit, and having a second output element coupled to said transverse circuit but spaced from said longitudinal magnetic circuit, and means for moving said record member relative to said playback head means to move the longitudinally recorded trace in the longitudinal direction across said longitudinal gap and to move said transversely recorded trace in the longitudinal direction across said transverse gap for producing an electric output from the first output element varying in accordance with the high frequency components of the signal recorded on the record medium and for producing an electrical variation in the second output element in accordance with the lower frequency components of the signal recorded on the record medium.

Other objects and features which I believe to be characteristic of my invention are set forth with particularity in the appended claim. My invention itself, however, both as to its organization, manner of construction, and method of operation, together with further objects and advantages thereof, may be best understood by reference to the following description taken in connection with the accompanying drawings, in which:

As shown on the drawings.

The embodiments of FIGURES 1 through 8 of the present invention illustrate transducer heads utilized in recording a combination longitudinal and transverse magnetic track on a magnetizable record member. These heads have been found to have the advantage of properly recording both low and high frequencies, and are thus particularly suitable for video recording involving a wide range of frequency components.

The disclosure of FIGURES 9 through 16 of the present application involve subject matter divided from Camras application Serial No. 248,360 entitled "Electromagnetic Transducer Head and Method of Recording" of which the present application is a continuation-in-part. Said Camras application Serial No. 248,360 is in turn a continuation-in-part of Camras U. S. Serial No. 137,001, filed January 5, 1950, and entitled "Electromagnetic Transducer Head," now Patent No. 2,628,285. The subject matter of FIGURES 9 through 16 relates to a transducer head construction for modifying a main recording field by means of a cross field to set up a resultant field with a very rapidly decaying magnetic intensity in the region of the trailing pole of the head assembly.

Figure 1:
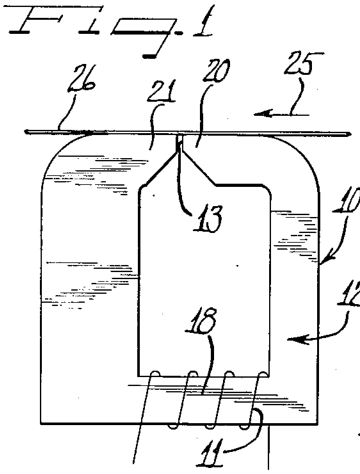
FIGURE 1 is a diagrammatic side elevational view of a first embodiment of an electromagnetic transducer head according to the present invention.

In the magnetic trasducer head 10 indicated diagrammatically in FIGURES 1 to 4, the high frequency component of a signal to be recorded is applied to the winding 11 linking the core 12 of the head for setting up the longitudinal recording field in the gap 13. The low and medium frequency components of the signal are applied by means of the coil 15 to the auxiliary pole piece 16 which connects centrally of the base 18 with the main core 12. The leg 16 has a pole piece 19 spaced laterally from the longitudinal pole pieces 20 and 21 to establish a transverse recording field in the recording gap 23, which is preferably of the order of 3 to 15 mils (one mil=.001 inch) wide depending on the response and on the output level desired. As indicated in FIGURE 1 by the arrow 25 an elongated record member 26 is adapted to move first over the pole 20, then the gap 13, and then over the pole 21. The high frequency components may be applied to the coil 11 without bias, but high frequency bias may be used in certain cases. The low and medium frequency components are preferably recorded with the aid of high frequency bias.

Figure 2:
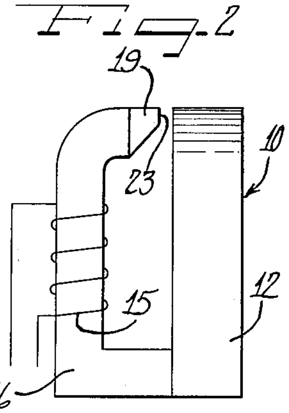
FIGURE 2 is a left side elevational view of the structure of FIGURE 1.
Figure 3:
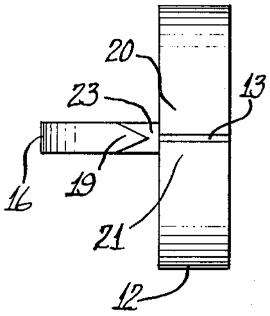
FIGURE 3 is a diagrammatic plan view of the structure of FIGURE 1.
Figure 4:
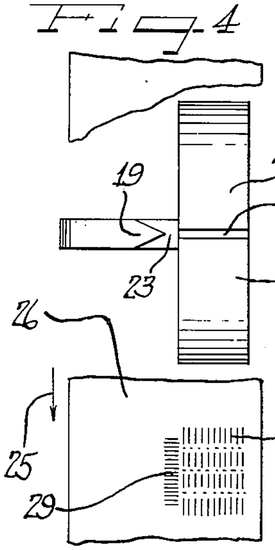
FIGURE 4 is a diagrammatic plan view similar to FIGURE 3 but illustrating the manner in which a signal is recorded on an elongated magnetizable medium by means of the head construction of FIGURE 1.

FIGURE 4 indicates the resultant magnetized sound track when the head of FIGURES 1 to 3 is employed, the sound track including a transverse magnetized region 29 and a longitudinally magnetized region 30.

Figure 5:
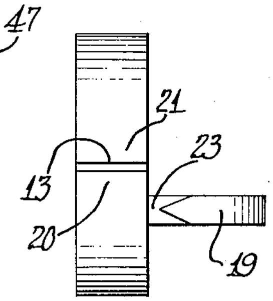
FIGURE 5 is a diagrammatic plan view similar to FIGURE 3, but illustrating the auxiliary pole piece as being off-set longitudinally as well as laterally from the main gap.

As indicated in FIGURE 5, the auxiliary pole piece 19 may be off-set longitudinally from the longitudinal gap 13 if desired.

Figure 7:
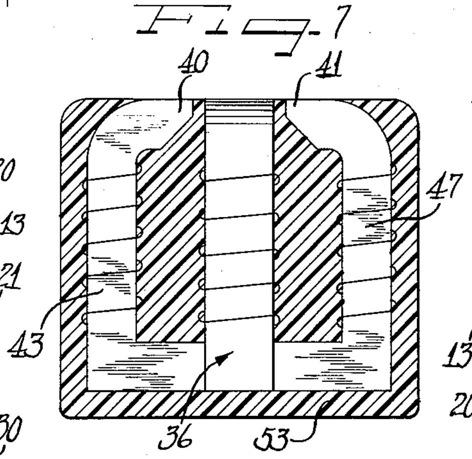
FIGURE 7 is a diagrammatic side elevational view of the structure of FIGURE 6 and indicating a housing for the head in section.
Figure 6:
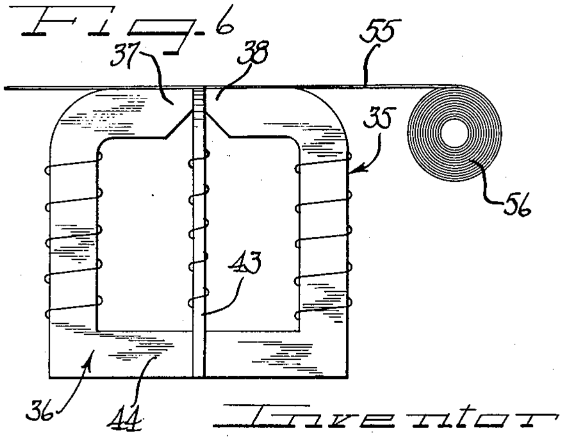
FIGURE 6 is a diagrammatic front elevational view of a third embodiment of electromagnetic transducer head according to the present invention.
Figure 8:
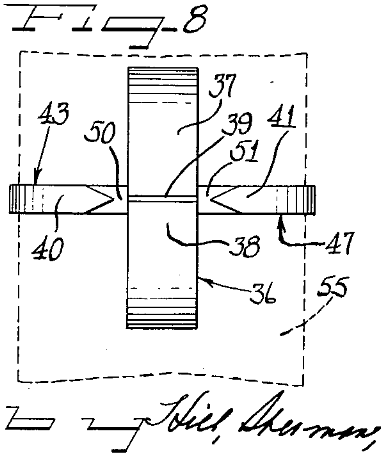
FIGURE 8 is a diagrammatic plan view of the structure of FIGURE 6 and indicating diagrammatically the relative position of an elongated magnetizable medium travelling over the head.

FIGURES 6, 7 and 8 illustrate a transducer head 35 which is particularly suited for video recording with an auxiliary sound track for the audio part of the signal. In this case, the longitudinal core 36 has a pair of poles 37 and 38 defining a non-magnetic gap 39, and the head is provided with auxiliary poles 40 and 41, one on each side of the main core 36. The core portion 43 providing the pole 40, for example, connects with the base portion 44 of the core 36, as does the core portion 47 providing the pole 41. The pole 40 defines a transverse gap 50 with the main core 36, while the pole 41 defines a transverse gap 51. The gap 50 may be utilized to record the low and medium frequency components of a video signal, while the gap 51 may be utilized to record the sound corresponding to the video signal. For ease in editing the tape, it is convenient to have the gaps 50 and 51 substantially aligned with the longitudinal gap 39. As indicated in FIGURE 7, the entire head may be embedded in a resin housing 53, and an elongated record member 55 may be moved across the gaps 39, 50 and 51, and wound on a take-up spool 56, FIGURE 6.

In each of the embodiments, the low and medium frequency auxiliary core, core 16 in FIGURE 2, and cores 43 and 47 in FIGURE 7, may be made of a ferrite composition or of mumetal, while the high frequency core, such as 12 in FIGURE 1 and 36 in FIGURE 6, may be of a ferrite composition.

Figure 9:
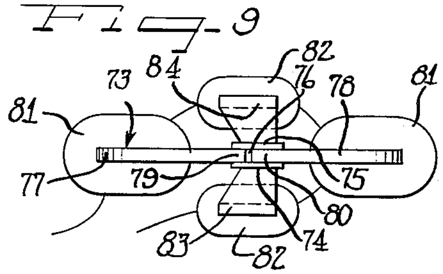
FIGURE 9 is a diagrammatic top plan view of a further modified form of the present invention utilizing a pair of auxiliary poles for establishing an auxiliary cross field to modify the main recording field of the head.
Figure 10:
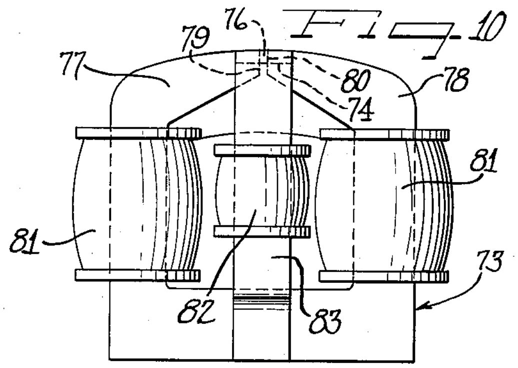
FIGURE 10 is a diagrammatic front elevational view of the head assembly of FIGURE 9.
Figure 11:
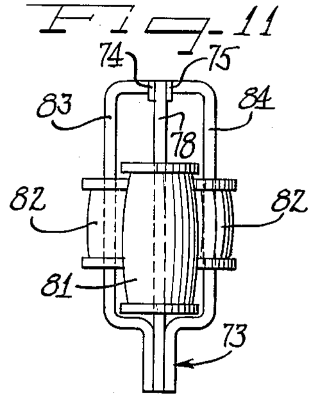
FIGURE 11 is a diagrammatic side elevational view of the head assembly of FIGURE 9.

By way of illustration of a further application of the lateral pole type head, in FIGS. 9, 10 and 11 is illustrated a magnetic transducer head for establishing a cross field to alter the shape and characteristics of the high frequency bias field at the main gap and/or the shape and characteristics of an intelligence signal field in the region of the main gap. In this case the effect of the auxiliary poles is to superimpose a cross field, indicated at A in FIGURE 15, onto the conventional longitudinal recording field B between the poles 60 and 61 defining the non-magnetic gap 62. The cross field A and the longitudinal field B may represent the bias field at the recording gap, or the intelligence signal to be recorded. Since the two magnetic fields A and B are superimposed on each other and are of the same frequency, a resultant magnetic field is obtained which has a shape as indicated by the lines C in FIGURE 16. Since the lines of equal magnetic potential lie at right angles to the flux lines shown in the various figures of the drawing, it will be readily understood by those skilled in the art that a very rapidly decaying magnetic field occurs in the region of the trailing pole 61.

Figure 16:
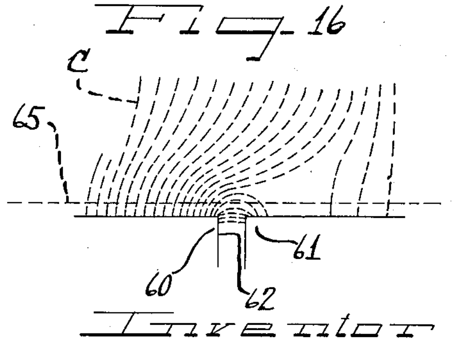
FIGURE 16 is a diagrammatic illustration of the resultant field corresponding to the superimposed fields of FIGURE 15.

It will furthermore be observed from an inspection of FIGURE 16 that the flux lines of the resultant field C extend generally at right angles to the magnetic record member 65 in the region of the leading pole 60, but lie substantially parallel thereto in the region of the trailing pole 61. Thus a much more nearly true longitudinal field is obtained than is the case with the conventional electromagnetic transducer heads of the present time which produce so-called longitudinal magnetic recording.

It will also be observed that by reversing the polarity of the field A with respect to the field B, a transverse recording field may be obtained rather than a longitudinal field, since in such event the vertical portion of the field will be in the region of the trailing pole piece 61 and the longitudinal portion will be in the region of the leading pole piece 60.

Adjustment of the exact resultant field C desired may be made by varying the number of turns on the main core portions, by reversing connections to the coils with respect to one another, or by locating an auxiliary coil on either or both legs of the main core portion. A preferred adjustment is to have the superimposed cross field A at the record gap 62 of the same order of magnitude as or less than bias field required by the record medium 65 at the record gap. One adjustment which has been successfully used is to make the cross field two-thirds of the required bias field at the record gap. A null point in the perpendicular component near the recording gap may be produced by adjusting the perpendicular components of the cross field and the bias field in the preferred manner.

In FIGURES 9, 10 and 11 of the drawings, I have shown a form of head construction in which a head 73 includes a generally ring type main core portion and a pair of auxiliary poles 74 and 75 mounted at the sides of a record gap 76 defined by core legs 77 and 78. The legs 77 and 78 have respectively a leading pole portion 79 and a trailing pole portion 80. A pair of signal or voice coils 81 are mounted on the core legs 77 and 78 and a pair of bias coils 82 are mounted on the auxiliary legs 83 and 84.

The voice and bias coils are illustrated as being connected in series and may thus be supplied with both the intelligence signal and the bias voltage. The auxiliary poles may be mounted in alignment with the gap 76; but if it is desired to obtain a longitudinally curving field in order to obtain better cancellation and thus a more rapidly diminishing field at the trailing pole, the auxiliary poles may be longitudinally offset from the gap 76. For example, if the auxiliary poles are longitudinally offset toward the leading pole (60 in FIGURE 15), it will be understood that the flux lines A in FIGURE 15 would be curved so that the field can be adjusted to produce better cancellation with field B and a more nearly complete null point in the perpendicular component of the resultant flux C at the trailing pole 61 near the recording gap. Furthermore, the field from an offset auxiliary pole will progressively diminish in intensity beyond the recording gap so that the desired sharp gradient may be obtained near the gap without excessive field being impressed on the record member after leaving the gap.

The auxiliary bias coils 82 are advantageously left connected during playback, since an improved pick-up is obtained as well as improved recording.

Figure 15:
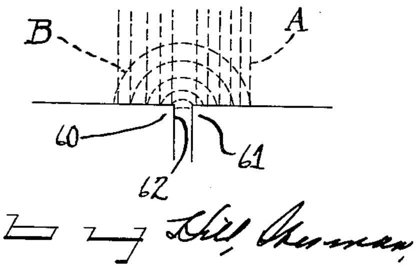
FIGURE 15 is a diagrammatic illustration of the superposition of a cross field upon a longitudinal recording field.

In the case where both voice and bias voltages are fed to all the coils, the flux diagrams of FIGURES 15 and 16 would be applicable to either the voice field or the bias field and to the resultant of the two fields in its general configuration. It will be understood by those skilled in the art that the head 73 of FIGURE 10 will give a voice field which is more uniform in the lateral direction when the bias coils 82 also receive the voice voltage.

Figure 12:
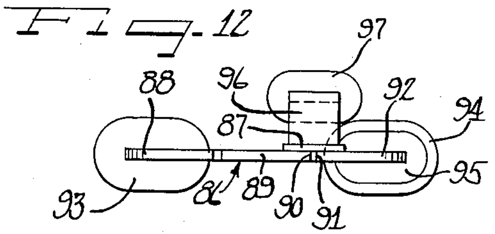
FIGURE 12 is a diagrammatic top plan view of a still further modified form of the present invention utilizing a single auxiliary pole.
Figure 13:
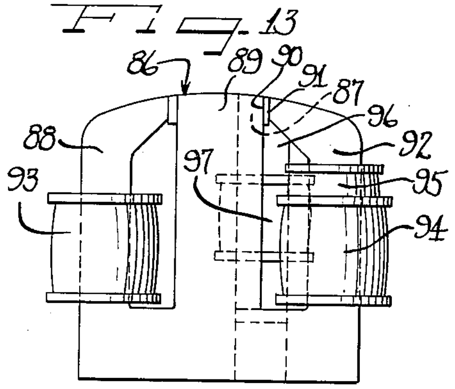
FIGURE 13 is a diagrammatic front elevational view of the head assembly of FIGURE 12.
Figure 14:
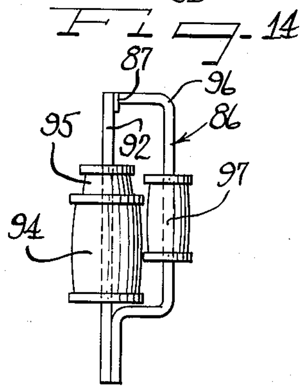
FIGURE 14 is a diagrammatic side elevational view of the head assembly of FIGURE 12.

In FIGURES 12, 13 and 14 of the drawings is illustrated a second form of the invention in which a head 86 has only a single auxiliary pole 87. The head may include an erase gap defined by an outer leg 88 and a center leg 89 and a record gap defined by a leading pole portion 90 of the center leg 89 and a training pole portion 91 of the other outer leg 92. Spacing of the gaps may be such that the erase coil has no substantial effect on the bias field as with conventional two-gap heads.

In this case an erase coil 93 is mounted on the outer leg 88 and a voice coil 94 and a bias coil 95 are illustrated as being mounted on the outer leg 92. The auxiliary leg 96 has an auxiliary coil 97 thereon. The erase coil 93 may be energized separately with the auxiliary coil 97, the voice coil 94 being energized with both bias and voice voltages, and the bias coil 95 not being used, or the erase coil 93, auxiliary coil 97 and bias coil 95 may all be energized from the same high frequency source.

As with the embodiment of FIGURES 9, 10 and 11, the auxiliary pole 87 may be displaced longitudinally as well as laterally from the longitudinal gap if desired.

It is to be understood that the present invention is not limited to the recording operation, since a reciprocal relation holds between recording and reproduction, as is usually the case in magnetic recording, and therefore beneficial results of a generally similar nature are obtained by the use of a head according to this invention in play-back or reproduction of a signal impressed upon a medium.

Referring to FIGURES 15 and 16, it will be seen that the cross field A should approximate in magnitude the main field B and cannot be negligible relative thereto if a substantially modified resultant field is to be obtained, such as indicated in FIGURE 16.

In the case of the two angularly related recording gaps, such as gaps 13 and 23 in FIGURE 4, it will be understood the gap 23, for example, could be disposed for perpendicular or vertical recording if desired by rearranging the polepiece 19, the perpendicular gap being arranged to define a record track distinct from that defined by the longitudinal gap 13. However, the transverse recording as shown appears more convenient.

It will be understood that modifications and variations may be effected without departing from the scope of the novel concepts of the present invention.

I claim as my invention:

A playback system comprising in combination a magnetic record member having a layer of magnetizable material with a pair of contiguous but laterally offset recorded traces extending therealong, one of said traces having magnetic fields extending substantially longitudinally to constitute a longitudinally recorded trace and the magnetic fields varying in the longitudinal direction along the record member in accordance with higher frequency components of a signal recorded on the record medium, the other of said traces having magnetic fields extending substantially transversely to constitute a transversely recorded trace, the magnetic fields varying in the longitudinal direction along the record member in accordance with lower frequency components of the signal recorded on the record medium, said recorded traces having substantially stronger leakage fields as a surface of said layer of magnetizable material than at the opposite surface of the record member, magnetic playback head means cooperating with said surface of said layer of magnetizable material and having a pair of pole portions defining a longitudinal gap for coupling the head means to said longitudinally recorded trace and having a pair of transversely spaced pole portions defining a transverse gap for coupling the head means to said transversely recorded trace, said magnetic playback head means having a longitudinal magnetic circuit including said pair of pole portions defining said longitudinal gap and having a transverse magnetic circuit including said transversely spaced pole portions and said transverse gap, said playback head means having a first output element linking said longitudinal magnetic circuit but spaced from said transverse circuit, and having a second output element coupled to said transverse circuit but spaced from said longitudinal magnetic circuit, and means for moving said record member relative to said playback head means to move the longitudinally recorded trace in the longitudinal direction across said longitudinal gap and to move said transversely recorded trace in the longitudinal direction across said transverse gap for producing an electric output from the first output element varying in accordance with the high frequency components of the signal recorded on the record medium and for producing an electrical variation in the second output element in accordance with the lower frequency components of the signal recorded on the record medium.

References Cited in the file of this patent

UNITED STATES PATENTS

| | | |
|---|---|---|
| 1,643,467 | O'Neill | Dec. 20, 1927 |
| 1,949,409 | Cohen | Mar. 6, 1934 |
| 2,213,246 | Heller | Sept. 3, 1940 |
| 2,272,821 | Roys | Feb. 10, 1942 |
| 2,285,079 | Behre | June 2, 1942 |
| 2,536,029 | Camras | Jan. 2, 1951 |
| 2,539,400 | Camras | Jan. 30, 1951 |
| 2,547,464 | Hehr | Apr. 3, 1951 |
| 2,643,130 | Kornei | June 23, 1953 |
| 2,712,572 | Roberts | July 5, 1955 |
| 2,803,708 | Camras | Aug. 20, 1957 |
| 2,832,839 | Muffly | Apr. 29, 1958 |

FOREIGN PATENTS

| | | |
|---|---|---|
| 174,220 | Austria | Mar. 10, 1953 |